United States Patent [19]

Siddall

[11] 3,977,807

[45] Aug. 31, 1976

[54] TWIST DRILLS

[75] Inventor: Keith Siddall, Sheffield, England

[73] Assignee: Osborn-Mushet Tools Limited, Sheffield, England

[22] Filed: May 27, 1975

[21] Appl. No.: 580,769

Related U.S. Application Data

[63] Continuation of Ser. No. 379,350, July 16, 1973, abandoned.

[30] Foreign Application Priority Data

July 21, 1972 United Kingdom............. 34325/72

[52] U.S. Cl................................ 408/223; 408/230
[51] Int. Cl.².......................................... B23B 51/02
[58] Field of Search .......... 408/223, 224, 225, 227, 408/229, 230, 707

[56] References Cited
UNITED STATES PATENTS

| 395,459 | 1/1889 | Shields | 408/224 |
| 750,537 | 1/1904 | Hanson | 408/230 |
| 2,389,909 | 11/1945 | Hotbauer | 408/224 |
| 2,479,136 | 8/1949 | Schade | 408/223 |

FOREIGN PATENTS OR APPLICATIONS

| 764,041 | 5/1934 | France | 408/223 |

Primary Examiner—Othell M. Simpson
Assistant Examiner—Z. R. Bilinsky

[57] ABSTRACT

A twist drill having primary lands and associated secondary lands the primary lands being relieved adjacent the major flanks so that each secondary land protrudes outwardly and forms a sizing flank for taking a "skimming" cut. The primary lands may be relieved either by being chamfered off at an angle or by the diameter across said primary lands being reduced for a limited distance from the major flanks.

6 Claims, 9 Drawing Figures

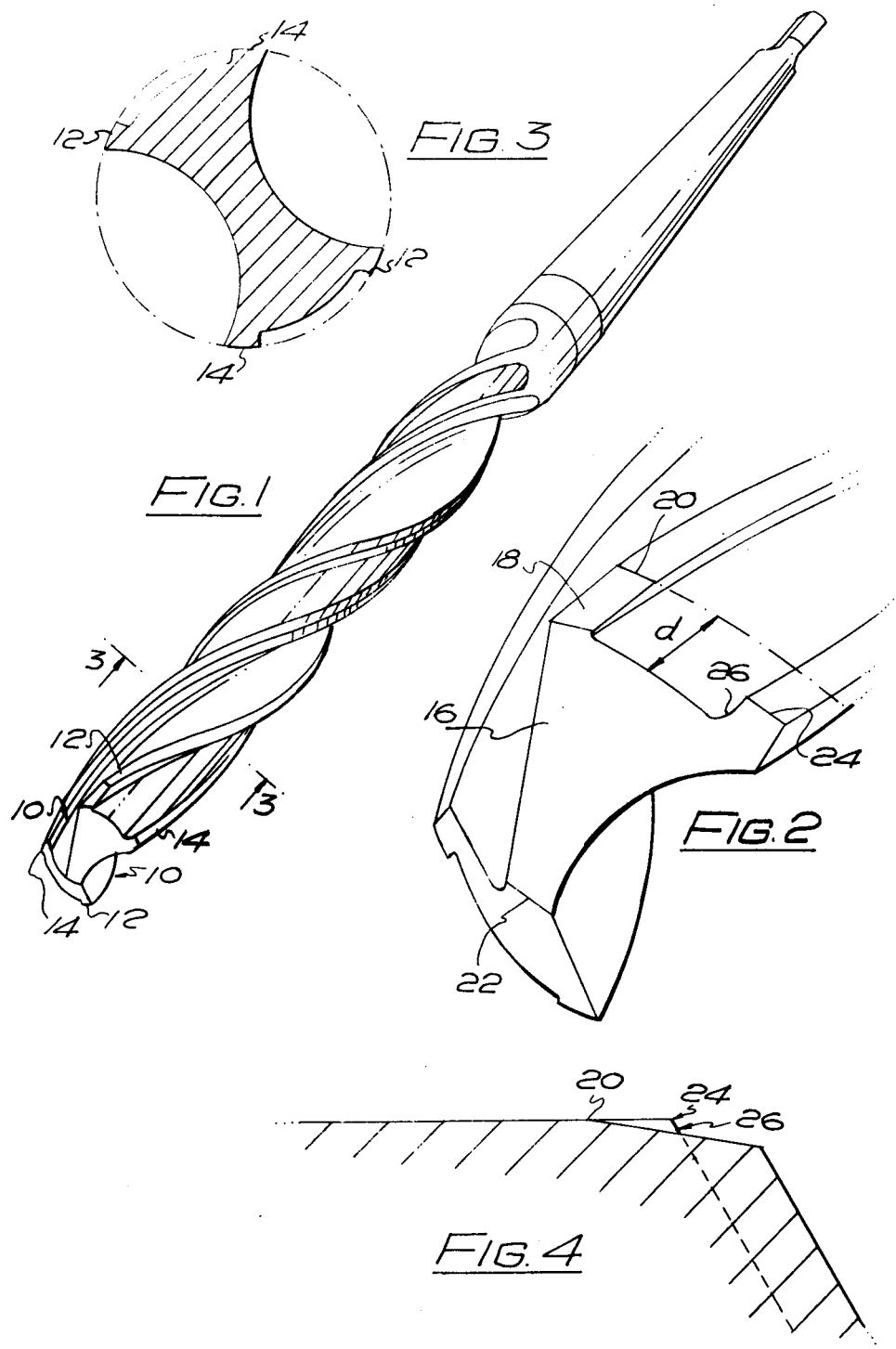

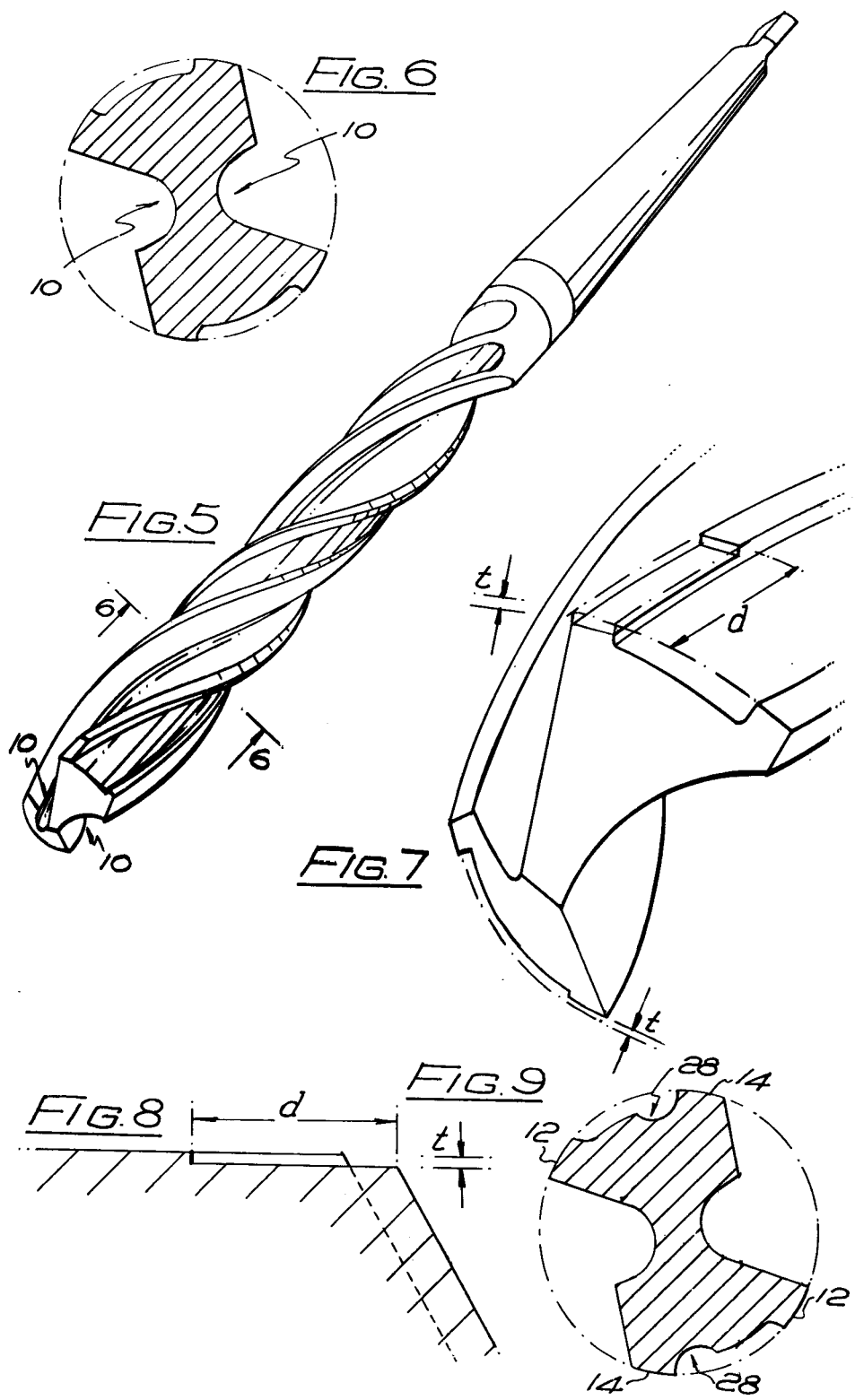

TWIST DRILLS

This is a continuation of application Ser. No. 379,350, filed July 16, 1973, and now abandoned.

The invention relates to twist drills and has for its object to provide an improvement therein. In particular it is the object of the invention to provide a twist drill which will have an extended life between re-grinds.

According to one aspect of the invention, there is provided a twist drill having primary lands and at least one secondary land associated with each primary land, the secondary lands extending along the body clearance diameter of the drill in circumferentially spaced relation to the associated primary lands, the primary lands being relieved by being chamfered off at an angle adjacent the major flanks so that the cutting edge extends along the edge of a major flank and along the edge of a minor flank produced by the chamfer, the chamfer being such that it runs out into the periphery of the primary land at a greater distance from the chisel edge at the tip of the drill than the major flank runs out at the periphery of the or each associated secondary land whereby each secondary land is caused to protrude axially outwardly of its associated primary land and forms a sizing flank for taking a "skimming" cut following the cut taken by said primary land, or alternatively, the primary lands being relieved by the radius across said primary lands being less than the radius across the secondary lands for a limited distance from the adjacent major flank so that each secondary land is caused to protrude radially outwardly of its associated primary land and forms a sizing flank for taking a skimming cut following the cut taken by said primary land. The distance over which the primary lands are relieved by being chamfered off at an angle adjacent the major flanks or by the radius across the primary lands being less than the radius across the secondary lands, as the case may be, will preferably extend less than a distance of twice drill diameter from the adjacent major flank. The roots of the drill flutes may be formed in such a way that the "chips" produced when the drill is in work are turned through an angle such that they fracture. In addition, a chip space clearance flute may be provided in front of each secondary land.

According to another aspect of the invention, there is provided a method of making a twist drill, the method including the steps of forming a fluted body with primary lands and with at least one secondary land associated with each primary land, and of relieving the primary lands for a limited distance from the major flank in such a way that the cutting edge runs out into the periphery of each primary land at a smaller diameter than said edge runs out into the periphery of each secondary land. Preferably, the step of relieving the primary lands will be effected by chamfering, by grinding, adjacent the major flanks so that said cutting edge extends along the edge of a major flank and along the edge of a minor flank produced by the chamfering operation, the extent of the chamfer being such that a sizing flank of the or each secondary land is caused to protrude axially outwardly of its associated primary land. Alternatively, the step of relieving the primary lands may be effected by reducing, by grinding, the diameter of the drill across said primary lands for a limited distance from the main flanks so that at the drill tip the sizing flanks of the secondary lands are caused to protrude radially outwardly of their associated primary lands.

In order that the invention may be fully understood and readily carried into effect, the same will now be described, by way of example only with reference to the accompanying drawings, of which:

FIG. 1 is a perspective view of a twist drill embodying the invention,

FIG. 2 is an enlarged view of the point end of the drill,

FIG. 3 is a transverse section through the drill on the line 3—3 in FIG. 1,

FIG. 4 is a diagrammatic view which will be referred to presently,

FIG. 5 is a view similar to FIG. 1 of a further form of twist drill embodying the invention, and FIG. 6 is a transverse section thereof on the line 6—6 in FIG. 5, FIG. 7 is a perspective view of an end section of a twist drill illustrating a further form of drill embodying the invention, FIG. 8 is a further diagrammatic view which will be referred to, and FIG. 9 is a further transverse section which will presently be referred to.

Referring now to FIGS. 1 to 4 of the drawings, the twist drill there illustrated is provided with flutes 10 and with primary lands 12 and secondary lands 14 associated with said primary lands. The secondary lands extend along the body clearance diameter of the drill in circumferentially spaced relation to the associated primary lands as shown.

The primary lands are relieved by being chamfered off at an angle adjacent the major flanks as best seen in FIG. 2. Consequently, the cutting edge extends along the edge of a major flank 16 and along the edge of a minor flank 18 produced by the chamfer. The chamfer is such that it runs out at 20, into the periphery of the primary land at a greater distance from the chisel edge 22 at the tip of the drill than the major flank runs out, at 24, into the periphery of the associated secondary land. Thus, so-called sizing flanks 26 of the secondary lands are caused to protrude axially outwardly of their associated primary lands. In effect, the primary lands are relieved in such a way that the cutting edge runs out into the periphery of each primary land at a smaller diameter than said edge runs out into the periphery of each secondary land. The arrangement is such that each secondary land forms a sizing flank for taking a skimming cut (of perhaps only a few thousandths of an inch) following the cut taken by the flank of the associated primary land.

It has been found that since the drill is formed with so-called double margins (that is to say primary and secondary lands) it has extra radial guidance and support. Consequently, rounder holes have been produced than with conventional twist drills. It has also been found that since the final hole sizing is effected by the sizing flanks of the secondary lands and away from the major heat generating zone at the flanks of the primary lands, the hole size accuracy has been increased and the life of the drill between re-grinds has been found to be much greater than that of comparable drills of conventional form. It will also be understood that the space between each primary land and its associated secondary land constitutes a coolant channel which assists in still further extending the life of the drill when a coolant is used.

The angle at which it is required to chamfer the primary lands and the extent of chamfering required can of course be determined by trial and experiment although of course there is a minimum distance which the chamfering must extend axially of the drill so that the sizing flanks protrude axially outwardly of their associated primary lands. (This is best seen in FIG. 2 where the sizing flank 26 is shown to be located in advance of an imaginary circumferential line encircling the drill and coinciding with the point 20. The result is also illustrated diagrammatically in FIG. 4 where a sizing flank 26 is shown to protrude axially outwardly of an associated primary land or that portion of the primary land which is of the same diameter. The sizing flank protrudes radially outwardly of the portion of the primary land located axially in advance of it). Generally, however, it can be said that the axial distance $d$ over which the chamfer of each primary land extends should be a minimum of ¼ drill diameter. Similarly, although there is no actual limit on the maximum distance $d$, it can be said that if the extra radial guidance and support provided by the double margins is to be maintained the distance $d$ should preferably not exceed roughly twice drill diameter, and of course such extra radial guidance and support is only obtained when drilling to a depth greater than the distance $d$.

Various modifications may be made without departing from the scope of the invention. For example, in FIGS. 5 and 6 there is illustrated a twist drill which is identical to that described above except that the roots of the drill flutes 10 have been formed in such a way that the chips produced when the drill is in work are turned through an angle such that they fracture.

In a further modification as shown in FIGS. 7 and 8, a twist drill which has a pair of primary lands and a pair of associated secondary lands has had its primary lands relieved by having the radius or diameter across said primary lands reduced by grinding for a limited distance $d$ from the adjacent major flank (by perhaps only a few thousandths of an inch, and the amount $t$ shown removed in the drawing has been exaggerated for the sake of clarity) so as to be less than the diameter across the secondary lands. Thus it will be seen that the sizing flanks of the secondary lands protrude radially outwardly of their associated primary lands. This is shown diagrammatically in FIG. 8. The result is thus the same as that described with reference to FIGS. 1 and 2; the primary lands remove the greater amount of metal during a drilling operation but the secondary lands control the final hole size. Intense heat is generated in the region of the primary lands but the sizing flanks operate at a comparatively cool temperature. It will of course be understood that this modified form of drill operates in a way substantially the same as that illustrated in FIGS. 1 to 4. The reduction of diameter across the primary lands extends for a distance such that the sizing flanks protrude axially outwardly of their associated primary lands and preferably somewhat more than that to allow a generous margin for re-sharpening of the drill by grinding of its major flanks alone. However, as in the case of the drill illustrated in FIGS. 1 to 3, this distance should preferably not exceed roughly twice drill diameter so as to maintain the extra radial guidance and support, and of course such extra radial guidance and support is only obtained when drilling to a depth greater than the distance $d$. The dimension $t$ by which the primary lands have been relieved may be determined for best results by trial and experiment. However it can be said that depending on the diameter of the drill and on the material on which it is to work the dimension $t$ should lie between 0.002 and 0.030 inch.

Referring now to FIG. 9, this shows a modification which can be incorporated in either of the embodiments described above, namely the provision of a chip space clearance flute 28 in front of each secondary land (the cross section in which the chip space clearance flute has been added being, for the sake of example only, that of the drill described with reference to FIGS. 5 to 8).

Various other modifications could be made without departing from the scope of the invention. For example, in a comparatively large drill it would be quite feasible to provide two or more secondary lands in association with each primary land.

What I claim and desire to secure by Letters Patent is:

1. A twist drill having a longitudinal axis and a cutting tip; a plurality of flutes extending helically longitudinally of the drill and having leading and trailing front edges at said tip; a chisel edge at said tip of the drill; lands located between the flutes, said lands comprising primary lands extending helically of the drill and at least one secondary land associated with each primary land and extending helically of the drill in circumferentially spaced relation to the rear of its associated primary land, a cutting tip comprising major flanks, each formed by said leading and trailing front edges of adjacent flutes, adjacent land and adjacent chisel edge, each of the primary lands being relieved for a limited distance from its adjacent major flank to form a minor flank; the leading front edge of each flute and the intersection of the flute with the minor flank defining a drill cutting edge which extends into the periphery of each primary land at a smaller radius from said longitudinal axis than it extends into the periphery of the associated secondary land so that each secondary land forms a sizing flank for taking a skimming cut following the cut taken by its associated primary land.

2. A twist drill according to claim 1, in which each primary land has been relieved by being chamfered off at an angle adjacent the major flank so that the cutting edge extends along the edge of a major flank from said chisel edge and along the edge of a minor flank produced by the chamfer, the chamfer being such that it extends into the periphery of each primary land at a greater distance from the chisel edge at the tip of the drill than said major flank extends at the periphery of its associated secondary land.

3. A twist drill according to claim 2, in which the distance over which each primary land is relieved by being chamfered off at an angle adjacent the major flank is less than a distance of twice drill diameter from the adjacent major flank.

4. A twist drill according to claim 1, in which the primary lands have been relieved by the radius across said primary lands having been made less than the radius across said secondary lands for a limited distance from the adjacent major flank so that each secondary land is caused to protrude radially outwardly of its associated primary land.

5. A twist drill according to claim 4, in which the distance over which the primary lands are relieved by the radius across the primary lands being less than the radius across the secondary lands is less than a distance of twice drill diameter from the adjacent major flank.

6. A twist drill according to claim 1, in which a chip space clearance flute is provided in front of each secondary land.

* * * * *